US 12,093,451 B2

United States Patent
Eble et al.

(10) Patent No.: US 12,093,451 B2
(45) Date of Patent: Sep. 17, 2024

(54) DISPLAY CALIBRATION

(71) Applicant: APPLE INC., Cupertino, CA (US)

(72) Inventors: Tobias Eble, Baden-Wurttemberg (DE); Tom Sengelaub, Oakland, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/014,848

(22) PCT Filed: Jun. 24, 2021

(86) PCT No.: PCT/US2021/038894
§ 371 (c)(1),
(2) Date: Jan. 6, 2023

(87) PCT Pub. No.: WO2022/010659
PCT Pub. Date: Jan. 13, 2022

(65) Prior Publication Data
US 2023/0324988 A1 Oct. 12, 2023

Related U.S. Application Data

(60) Provisional application No. 63/049,711, filed on Jul. 9, 2020.

(51) Int. Cl.
*G09G 5/00* (2006.01)
*G06F 3/01* (2006.01)
*G06T 7/70* (2017.01)

(52) U.S. Cl.
CPC .......... *G06F 3/013* (2013.01); *G06T 7/70* (2017.01); *G06T 2207/30244* (2013.01)

(58) Field of Classification Search
CPC .......... G06F 3/013; G06F 3/147; G06F 1/163; G06T 7/70; G06T 2207/30244;
(Continued)

(56) References Cited

U.S. PATENT DOCUMENTS 8,576,143 B1 11/2013 Kelly
10,424,295 B2 9/2019 Haseltine et al.
(Continued)

FOREIGN PATENT DOCUMENTS

WO 2021/121836 A1 6/2021

OTHER PUBLICATIONS

PCT) European Patent Office (ISA/EP), International Search Report and Written Opinion of the International Searching Authority, International Application No. PCT/US2021/038894, 13 pages, Nov. 3, 2021.
(Continued)

*Primary Examiner* — Jennifer T Nguyen
(74) *Attorney, Agent, or Firm* — Thompson Hine LLP

(57) ABSTRACT

Various implementations disclosed herein include devices, systems, and methods that assess calibration between eye tracking and other components of a head-mounted device (HMD) using another device, such as a mobile device. For example, an example process may include obtaining first sensor data captured by a first sensor of a first device, the first sensor data including a representation of a portion of a second device, obtaining second sensor data captured by a second sensor of the second device, detecting a position of the first sensor of the first device based on the second sensor data, and assessing a calibration between the portion of the second device and the sensor of the second device based on the first sensor data and the detected position of the first sensor.

19 Claims, 7 Drawing Sheets

(58) Field of Classification Search
CPC ............... G06T 13/80; G02B 27/0179; G02B 27/0172; G02B 27/0093; G02B 2027/0178; G02B 2027/0174; G02B 2027/0187; G02B 2027/014; G09G 3/002; G09G 2370/022; G09G 5/37; G09G 2320/0693; G09G 2354/00; G09G 2340/0464
USPC ........................................................ 345/156
See application file for complete search history.

(56) References Cited

U.S. PATENT DOCUMENTS

| | | | |
|---|---|---|---|
| 10,579,141 B2 | 3/2020 | Aleem et al. | |
| 2012/0323515 A1* | 12/2012 | Liu | G02B 27/017 702/97 |
| 2017/0115690 A1 | 4/2017 | Liu et al. | |
| 2018/0217664 A1* | 8/2018 | Yamada | A61B 5/6803 |
| 2022/0083134 A1* | 3/2022 | Kassner | G06F 3/013 |

OTHER PUBLICATIONS

Gilson, S.J. et al., "An automated calibration method for non-see-through head mounted displays," Journal of Neuroscience Methods, vol. 199, No. 2, pp. 328-335, May 2011.

Lee, C-R. et al., Gyroscope-aided Relative Pose Estimation for Rolling Shutter Cameras, arxiv.org, Cornell University Library, Ithaca, NY, XP081169125, 9 pages, Apr. 2019.

Mercier, O. et al., "Fast Gaze-Contingent Optical Decompositions for Multifocal Displays," ACM Transactions on Graphics, vol. 36, No. 6, Article 237, pp. 237:1-237:15, Nov. 2017.

Plopski, A. et al., "Corneal-Imaging Calibration for Optical See-Through Head-Mounted Displays," IEEE Transactions on Visualization and Computer Graphics, vol. 21, No. 4, pp. 481-490, Apr. 2015.

* cited by examiner

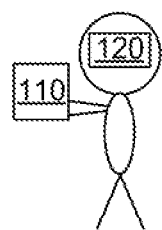 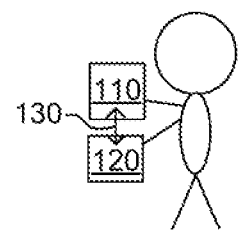
FIG. 1A  FIG. 1B

DISPLAY CALIBRATION

TECHNICAL FIELD

The present disclosure generally relates to providing user experiences on head-mounted devices (HMDs), and in particular, to systems, methods, and devices for assessing calibration on such devices.

BACKGROUND

Electronic devices such as head-mounted devices (HMDs), laptops, desktops, and mobile devices can have cameras or other sensors that capture data used to determine the relative position of an eye of a user to the display (as well as determine gaze direction). In some circumstances, such devices can lose calibration, for example, if the device is dropped or subject to a severe physical impact. A user could take his or her device to a be calibrated at a factory store or other location having specialized calibration equipment, but this takes time and may be inconvenient.

SUMMARY

Various implementations disclosed herein include devices, systems, and methods that provide improved calibration on head-mounted devices (HMDs). Some implementations involve assessing the calibration between the eye tracking and other components of an HMD, e.g., whether these components are in the expected physical relationships relative to one another or different relative positions due to the device having been dropped, etc. Recalibration is needed if the HMD components (e.g., the display screen) that a user's eye actually sees differs from what is expected to be seen from an eye position tracked by the HMD's eye tracking components, e.g., a mismatch in the positions of the display screen in the actual and expected views is indicative of calibration loss. In one implementation, assessing the calibration of an HMD may include using a camera of a second device (e.g., a mobile device camera) as a proxy for the user's eye. The HMD eye tracking components can determine the position of mobile device camera instead of the user's eye. Additionally, the method can compare what the HMD expects the mobile device camera to see based on the camera position detected by the eye tracking components with an image actually seen/captured by the mobile device at its actual position.

In general, one innovative aspect of the subject matter described in this specification can be embodied in methods that include the actions of obtaining first sensor data captured by a first sensor of a first device, the first sensor data comprising a representation of a portion of a second device, obtaining second sensor data captured by a second sensor of the second device, detecting a position of the first sensor of the first device based on the second sensor data, and assessing a calibration between the portion of the second device and the sensor of the second device based on the first sensor data and the detected position of the first sensor.

These and other embodiments can each optionally include one or more of the following features.

In some implementations, assessing a calibration between the portion of the second device and the sensor of the second device based on the first sensor data and the detected position of the first sensor includes capturing a first image of the display of the second device by a camera on the first device, obtaining a second image that comprises an expected depiction of the display of the second device expected to be captured at the detected position of the camera of the first device, comparing the first image and the second image to detect differences between the first image and the second image, and determining a difference amount based on the detected differences between the first image and the second image.

In some implementations, assessing a calibration between the portion of the second device and the sensor of the second device based on the first sensor data and the detected position of the first sensor includes determining an actual position of the first sensor based on the first sensor data, comparing that actual position of the first sensor with the detected position of the first sensor to detect differences between the actual position and the detected position of the first sensor, and determining a difference amount based on the detected differences between the actual position and the detected position of the first sensor.

In some implementations, comparing the difference amount to a difference threshold to determine whether calibration is needed. In some implementations, in response to determining that calibration is needed, the method further comprises determining a type of calibration that is needed.

In some implementations, the method further includes adjusting calibration of the second device based on the assessed calibration of the second device. In some implementations, adjusting calibration of the second device comprises adjusting one or more components of the second device to compensate for differences between an actual position of the first sensor and the detected position of the first sensor so that the of the first sensor is adjusted to a calibrated state.

In some implementations, the first sensor is a camera and obtaining first sensor data captured by a first sensor comprises capturing one or more images of the portion of the second device. In some implementations, the portion of the second device comprises a display of the second device. In some implementations, the portion of the second device comprises an infrared (IR) ring generated by the second device.

In some implementations, obtaining second sensor data captured by the second sensor comprises tracking data obtained from eye-tracking components of the second device.

In some implementations, obtaining second sensor data captured by the second sensor comprises tracking data obtained by producing infrared (IR) elements that are reflected off the first device to produce reflections that are captured by an IR sensor on the second device.

In some implementations, detecting a position of the first sensor of the first device is further based on tracking sensor data obtained from an inertial measurement unit (IMU) on the first device.

In some implementations, the first sensor is at least one of a light intensity camera, a depth camera, an inertial measurement unit (IMU), and a gyroscope. In some implementations, the first device is a mobile device. In some implementations, the second device is a head-mounted device (HMD).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A and 1B illustrate example operating environments in accordance with some implementations.

Figure 2:
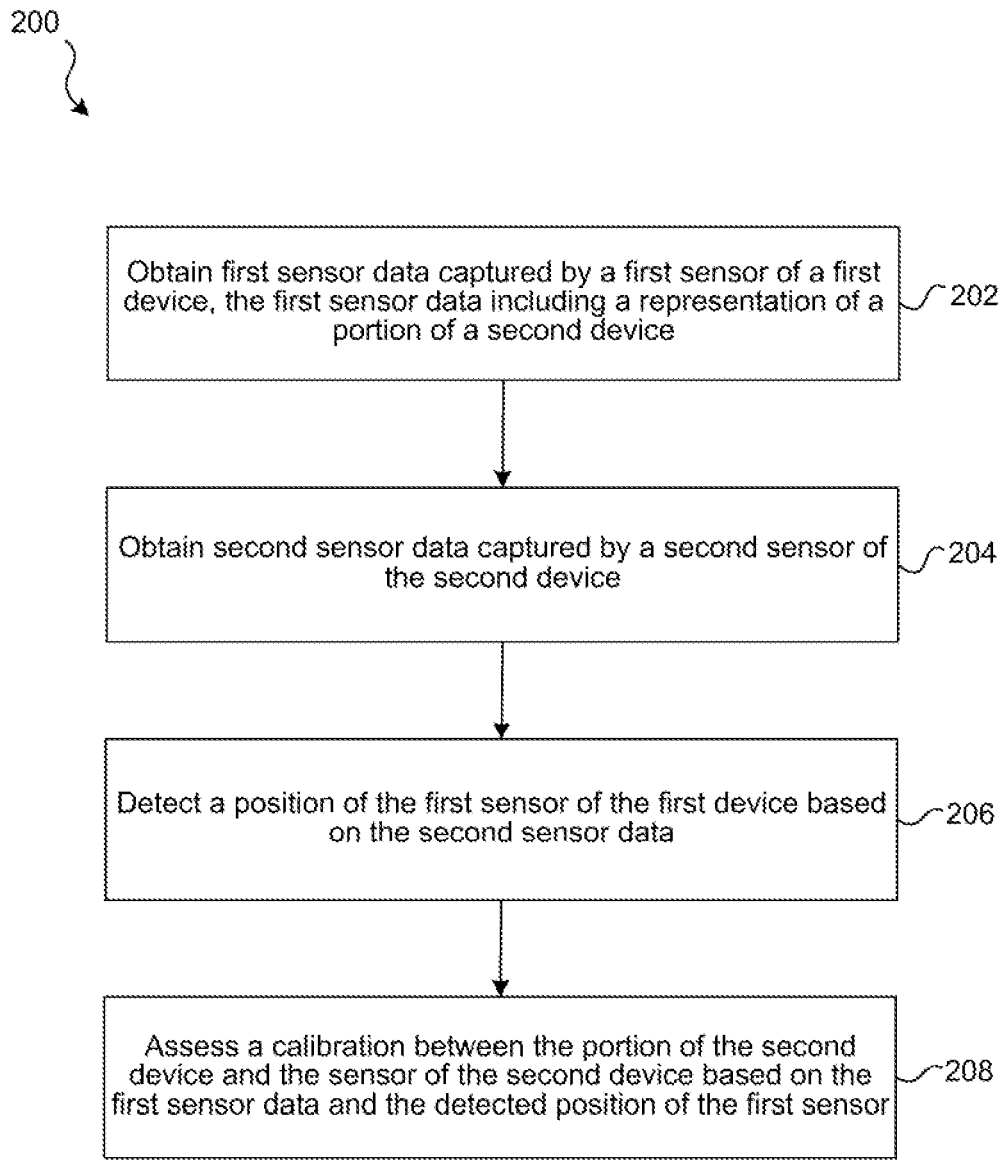
FIG. 2 is a flowchart representation of assessing calibration of a device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide improved calibration techniques for devices such as HMDs. Some implementations involve assessing the calibration between the eye tracking and other components of an HMD, e.g., whether these components are in the expected physical relationships relative to one another or different relative positions due to the device having been dropped, etc. Recalibration is needed if the HMD components that a user's eye actually sees differs from what is expected to be seen from an eye position tracked by the HMD's eye tracking components. For example, in one implementation, assessing the calibration of an HMD may include using a camera of a second device (e.g., a mobile device camera) as a proxy for the user's eye. The HMD eye tracking components can determine the position of mobile device camera instead of the user's eye. Additionally, the method can compare what the HMD expects the mobile device camera to see based on the camera position detected by the eye tracking components with the image actually seen by the mobile device.

The phrase "user experience" as used herein refers to what the user sees on one or more displays of an electronic device. A user experience may include what the user sees when the user looks through the one or more lenses of the HMD at content presented on the one or more displays of the HMD. For example, content, such as a movie, or series of extended reality (XR) images may be presented on the HMD. The substance of that content may be consistent (e.g., the underlying movie frames are the same for different users and contexts). However, the user experience may be different for different users and contexts. Specifically, the distorted images rendered on the display for different contexts may differ depending on the user's pupil position, gaze direction, etc. Thus, for example, given a fixed movie frame of content, if the user is looking to the left side of the display, a distorted image of the movie frame may be different than a distorted image of the movie frame that would be displayed if the user was looking to the right side of the display.

The phrase "image" as used herein refers to content this is captured by a camera and/or displayed on some or all of a display space. It is noted that a user experience can involve a sequence of images presented over time on a display. Each image may replace a some or all of a previously-displayed image in the sequence, e.g., according to a frame rate. In some implementations, an image entirely replaces a prior image in the sequence in the display space of the display. In some implementations, an image replaces only a portion of the display space and some or all of the remaining potions of the display space are occupied by content from a prior image in the sequence or occupied by content viewed through a see-through display.

FIGS. 1A and 1B illustrate an example operating environment 100a and 100b, respectively, in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100a and 100b includes a device 110 and a head-mounted device (HMD) 120. In particular, FIG. 1A illustrates scene 105a of a user wearing the HMD 120 and holding the device 110. FIG. 1B illustrates scene 105b of a user holding the HMD 120 in one hand, and holding the device 110 in the other hand and the user is utilizing one or more of the calibration techniques described herein.

In some implementations, the device 110 is configured to manage and coordinate a user experience for a user. In some implementations, the device 110 is a base or external computer device. In some implementations, the device 110 includes a suitable combination of software, firmware, and/or hardware. The device 110 is described in greater detail below with respect to FIG. 5. In some implementations, the device 110 is a computing device that is local or remote relative to the scene 105a and scene 105b. In one example, the device 110 is a local server or other device located within the scene 105. In another example, the device 110 is a remote server or other device located outside of the scene 105 (e.g., a cloud server, central server, etc.). In some implementations, the device 110 is communicatively coupled with the HMD 120 via one or more wired or wireless communication channels 144 (e.g., BLUETOOTH, IEEE 802.11x, IEEE 802.16x, IEEE 802.3x, etc.). For example, as illustrated in scene 105b of FIG. 1B, the device 110 communicatively coupled with the HMD 120 via bidirectional link 130.

In some implementations, the HMD 120 is configured to present the user experience to the user. In some implementations, the HMD 120 includes a suitable combination of software, firmware, and/or hardware. In some implementations, the user wears the HMD 120 on his/her head. As such, the HMD 120 includes one or more displays provided to display images. The HMD 120 may enclose the field-of-view of the user. The HMD 120 is described in greater detail below with respect to FIGS. 6 and 7. In some implementations, some of the functionalities of the device 110 are provided by and/or combined with the HMD 120.

FIG. 2 is a flowchart representation of a method 200 of calibration techniques for a device in accordance with some implementations. In some implementations, the method 200 is performed by a first device (e.g., device 110 of FIG. 1), such as a mobile device, desktop, laptop, or server device) and a second device, such as an HMD (e.g., HMD 120 of FIG. 1). In these examples, the device and the HMD are separate devices and the device may wirelessly receive images or data from the HMD and/or transmit the images, calibration corrections, and the like to the HMD. In some implementations, the method 200 is performed by processing logic, including hardware, firmware, software, or a combination thereof. In some implementations, the method 200 is performed by a processor executing code stored in a non-transitory computer-readable medium (e.g., a memory).

The user experience includes images (e.g., a sequence of frames or other images) displayed on at last a portion of a display space of a display of the HMD and viewed through one or more lenses of the HMD. For example, content, such as a movie, a sequence of images depicting three-dimensional (3D) content, a series of extended reality (XR) images may be presented on the HMD or provided to the HMD for presentation. The images may include any content that is displayed on some or all of a display space. Each image may replace some or all of a previous image in a sequence, e.g., according to a frame rate. In some implementations, an image entirely replaces a prior image in the sequence in the display space of the display. In some implementations, an image replaces only a portion of the display space and some or all of the remaining potions of the display space are occupied by content from a prior image in the sequence or seen through a see-through-display.

At block 202, the method 200 obtains first sensor data captured by a first sensor (e.g., camera, inertial measurement unit (IMU), etc.) of a first device (e.g., a mobile phone), and the first sensor data includes a representation (e.g., an image) of a portion of a second device (e.g., an HMD such as HMD 120). For example, the user positions a camera of a mobile device to capture one or more images of a portion (e.g., the display, the IR ring, etc.) of the HMD as if the camera of the mobile device were the eyes of the user.

In some implementations, the first device is a mobile device (e.g., device 110 of FIG. 1). In some implementations, the first sensor is at least one of a light intensity camera (e.g., an RGB camera), a depth camera (e.g., time-of-flight, IR, and the like), an IMU, and/or a gyroscope. In some implementations, the second device is an HMD (e.g., HMD 120 of FIG. 1).

In some implementations, the first sensor is a camera and obtaining first sensor data captured by a first sensor includes capturing one or more images of the portion of the second device. In some implementations, the portion of the second device includes a display of the second device. For example, a mobile device (e.g., device 110) captures an image of the display of an HMD (e.g., HMD 120). In some implementations, the portion of the second device includes an infrared (IR) ring generated by the second device. For example, a mobile device (e.g., device 110) captures an image of an IR ring generated by an HMD (e.g., HMD 120).

At block 204, the method 200 obtains second sensor data captured by a second sensor of the second device (e.g., an HMD such as HMD 120 of FIG. 1). For example, in some implementations, the tracking data may be obtained from the eye-tracking components of the HMD. Additionally, or alternatively, the tracking data may be obtained by producing IR elements that are reflected off the first device to produce reflections that are captured by an IR sensor. The same pattern, e.g., the ring of IR dots on the HMD, may be used for both eye-tracking and first sensor tracking. The tracking may use IMU sensor data.

At block 206, the method 200 detects a position of the first sensor of the first device based on the second sensor data. For example, the HMD's eye tracking components provide data that may be used to track the position of the camera of the first device instead of the user's eye. In some implementations, detecting a position of the first sensor of the first device is further based on tracking sensor data obtained from an IMU on the first device.

At block 208, the method 200 assesses a calibration between the portion of the second device and the sensor of the second device (e.g., whether calibration is needed, an amount/type of calibration needed, etc.) based on the first sensor data and the detected position of the first sensor. In a first implementation, this involves comparing the first image (e.g., the actual depiction of the display of the second device captured by the first device camera) with an expected depiction of the display expected to be captured at the detected position of the camera. A sufficient difference can be used to infer that calibration is needed. In a second implementation, this may involve determining an actual position of the camera based on the first sensor data and comparing that actual camera position with the detected position of the camera.

In some implementations, an image of the display of the HMD can be captured by a camera of a mobile device and the captured image may be compared with an expected image of the display at a particular position. In an exemplary implementation, assessing a calibration between the portion of the second device and the sensor of the second device based on the first sensor data and the detected position of the first sensor includes capturing a first image of the display of the second device by a camera on the first device, obtaining a second image that includes an expected depiction of the display of the second device expected to be captured at the detected position of the camera of the first device, comparing the first image and the second image to detect differences between the first image and the second image, and determining a difference amount based on the detected differences between the first image and the second image. This example implementation can be used to detect calibration issues with the eye tracking components of the HMD 120 and/or calibrate distortion effect of the eyepiece of the HMD 120. This example implementation of comparing a captured image of the HMD from a mobile device and comparing it to an expected image is further described herein with respect to FIG. 3.

In some implementations, assessing calibration of an HMD may be based on determining an actual position of the camera on the calibration device. In an exemplary implementation, assessing a calibration between the portion of the second device and the sensor of the second device based on the first sensor data and the detected position of the first sensor includes determining an actual position of the first sensor based on the first sensor data, comparing that actual position of the first sensor with the detected position of the first sensor to detect differences between the actual position and the detected position of the first sensor, and determining a difference amount based on the detected differences between the actual position and the detected position of the first sensor. This example implementation of determining an actual position of the camera on the calibration device is further described herein with respect to FIG. 4.

In some implementations, the method 200 may further include comparing the difference amount to a difference threshold to determine whether calibration is needed. For example, a difference threshold during a calibration assessment may be set at any difference greater than or equal to 1 mm. In some implementations, in the example of comparing a captured image to an expected image on the HMD, if the comparison of the images is shifted greater than 1 mm, then the method 200 would determine that calibration is required (e.g., display a notification to the user that the HMD needs to be recalibrated). In some implementations, in the example of detecting differences between the actual position and the detected position of the first sensor, if the comparison of the positions is shifted greater than 1 mm, then the method 200 would also determine that calibration is required.

In some implementations, there may be a second difference threshold. For example, a first difference threshold (e.g., 1 mm as described above) may be used to signal to the user that calibration is recommended for optimal performance of the HMD. In other words, the HMD may need some tweaking with recalibration, but the user experience may not be diminished enough to be noticeable to the user during the experience. The second difference threshold could then be used (e.g., greater than or equal to 5 mm) signal to the user that calibration is required. In other words, the HMD will likely not function properly and needs recalibration.

In some implementations, the method 200 may further include determining a type of calibration that is needed in response to determining that calibration is needed. For example, the IR or LED ring on the HMD may be determined to need calibration. In some implementations, the eye tracking technology on the HMD may need to be recalibrated. In some implementations, the mobile device can detect the type of calibration needed and provide the user with steps on how to recalibrate the HMD (e.g., display a "how to" video with step-by-step instructions). Additionally, or alternatively, determining a type of calibration that is needed may include determining whether the mobile device and/or the HMD can perform the calibration for the HMD, or whether the HMD would need to go the OEM store or factory in order to get professionally recalibrated (e.g., reset factory settings).

In some implementations, the method 200 may further adjust the second device, e.g., the HMD, based on the assessed calibration of the second device. For example, one or more components of the HMD can be adjusted to compensate for the differences between the actual position and the detected position of the first sensor so that the HMD is adjusted back to its calibrated state. This can be performed by any suitable method, such as by manually adjusting a display/IR ring/sensor according to specific instructions generated by the HMD for the user, or by a device that can physically move the display/IR ring/sensor back into calibration. Additionally, or alternatively, an operation of one or more components can be adjusted based on the assessed calibration of the second device. As an example, display data sent to the display of the second component for displaying an image can be modified to compensate for the differences between the actual position and the detected position of the first sensor. For example, the modification can include adjusting pixel data to move/warp parts of the image displayed on the display so that the image compensates for the detected differences. That way, the second device can be self-calibrated at the end user without requiring the device to be sent back to the manufacturer.

In some implementations, fiducial markers may be used with a first device for calibration. For example, fiducial markers may be placed on a case of mobile phone (e.g., on the back of the mobile phone) and the HMD could be localized based on the mechanical placement of the fiducials on the device. Thus, the assessment device may be a device that allows for placement of fiducial markers at a particular location that can be used for localization and calibration. For example, the carrying case for the HMD may be a rigid case with fiducial markers for a calibration assessment. In some implementations, a camera could be attached to a mirror (e.g., to reflect the IR light from the HMD), or a camera could be attached to a rigid object (e.g., a carrying case) with fiducial markers, and together with the camera, can link to the HMD 120 fora bidirectional link (e.g., bidirectional link 130 of FIG. 1). Additionally, or alternatively, fiducial markers could be presented on the display of a mobile device (e.g., device 110). For example, an image could be displayed on a display of a mobile device that can be used for a calibration assessment with the HMD.

Figure 3:
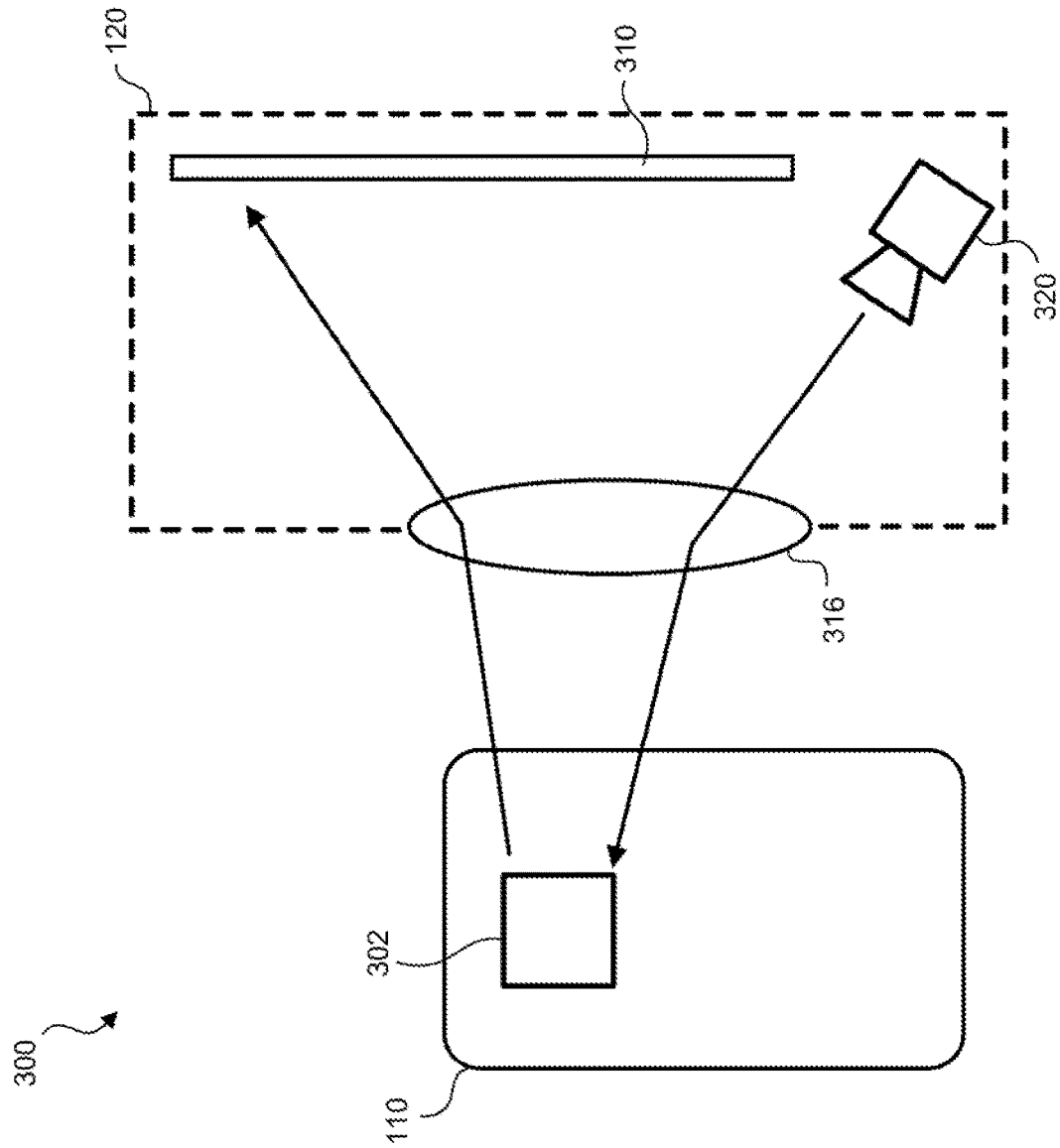
FIG. 3 illustrates an example calibration technique for an head-mounted device (HMD) in accordance with some implementations.

FIG. 3 illustrates an example environment 300 of a calibration technique for an HMD (e.g., HMD 120 of FIG. 1) in accordance with some implementations. In some implementations, an image presented on the display 310 of the HMD 120 can be captured by a camera 302 of device 110 (e.g., a mobile device) through the eye piece lens 316 of the HMD 120. The captured image of the display 310 may then be compared with an expected image of the display 310 at a particular position. In an exemplary implementation, assessing a calibration between a portion of the HMD 120 (e.g., a portion of the display 310) and the sensor of the HMD 120 (e.g., IR camera 320) based on the image data and the detected position of the device 110 (e.g., from the IMU) includes capturing a first image of the display 310 of the HMD by a camera on the device 110, obtaining a second image that includes an expected depiction of the display 310 of the HMD 120 expected to be captured at the detected position of the camera 302 of the device 110, comparing the first image and the second image to detect differences between the first image and the second image, and determining a difference amount based on the detected differences between the first image and the second image. For example, as illustrated in FIG. 3, the device 110 is being pointed toward the HMD 120 eyepiece 316, with the camera 302 of the device 110 facing HMD 120 in order to view the display 310 through the eyepiece 316. The camera 302 of the device 110 captures images of the display 310 of the HMD 120, and the IR camera 320 on the HMD can detect IR reflections from the camera 302 of the LED rings on the HMD 120, as further discussed herein with reference to FIG. 4. The images of the display 310 of the HMD 120 captured by the camera 302 of the device 110 can be used to determine an actual position of the camera 302, while the detected IR reflections of the LED rings on the HMD 120 as they are reflected off of the device 110 can be used to determine a detected position of the camera 302. Both the actual position and detected position of the camera 302 can be used to detect calibration issues with the eye tracking components of the HMD 120 and/or to calibrate distortion effect of the eyepiece 316 of the HMD 120.

In some implementations, the camera 302 of the device 110 can be used to capture an image of an LED ring(s) (e.g., multiple LEDs that surround the arcuate shape of each eyepiece) around each eye hole of the eyepiece 316. For example, an image of an LED ring can be used by the device 110 to analyze and determine whether there are any defects in any of the LEDs of the LED ring. For example, the device can determine based on the captured image whether each LED is on, whether the actual position of each LED is aligned, or other possible defects, to detect calibration issues with the eye tracking components of the HMD 120 and/or to calibrate distortion effect of the eyepiece 316 of the HMD 120.

Figure 4:
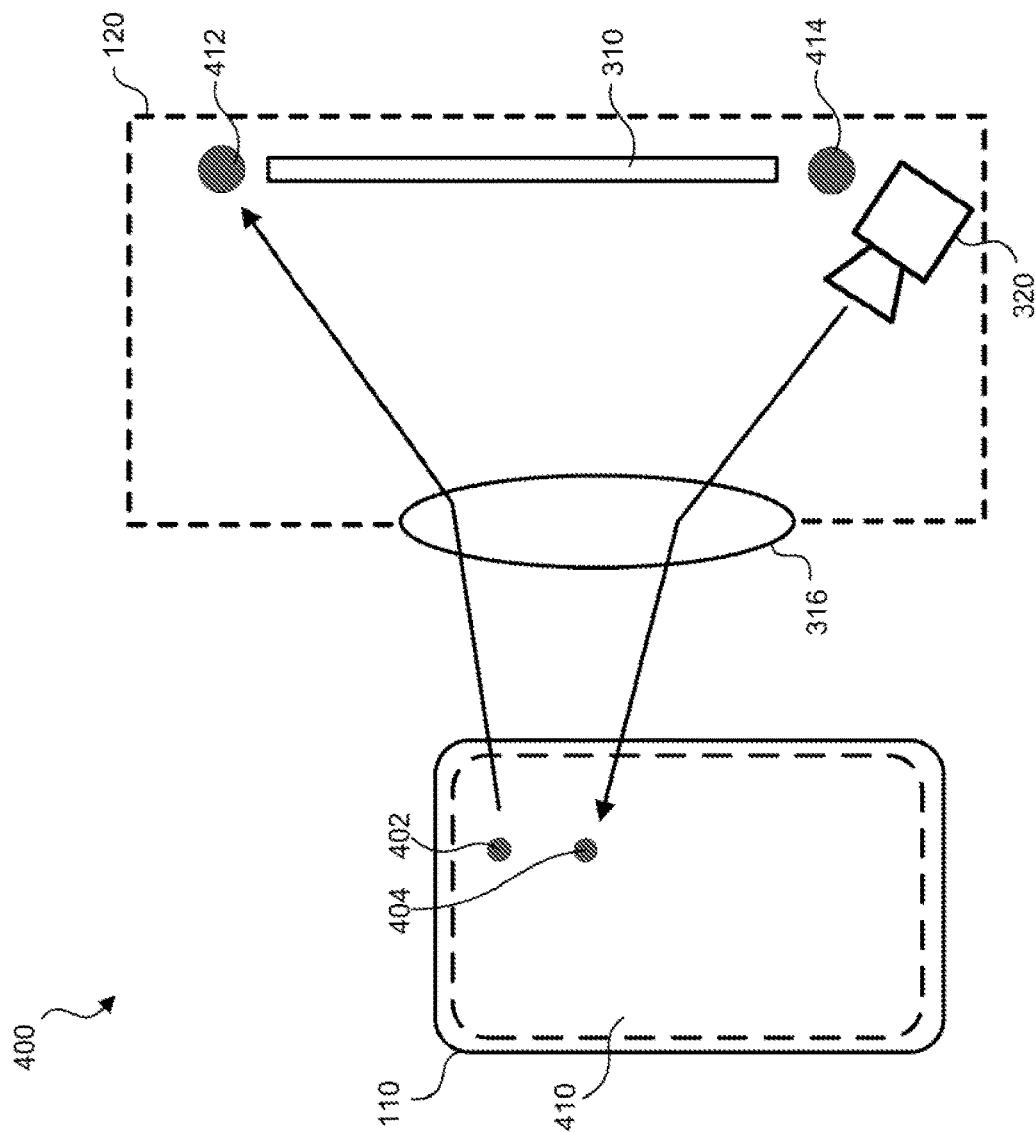
FIG. 4 illustrates an example calibration technique for an HMD in accordance with some implementations.

FIG. 4 illustrates an example environment 400 of a calibration technique for an HMD (e.g., HMD 120 of FIG. 1) in accordance with some implementations. In some implementations, assessing calibration of an HMD (e.g., assessing the eye tracking components, the IR ring, etc. of HMD 120) may be based on determining an actual position of the camera on the calibration device (e.g., device 110). In an exemplary implementation, assessing a calibration between the portion of the HMD 120 (e.g., a portion of the display 310) and the sensor of the HMD 120 (e.g., IR camera 320) based on the first sensor data and the detected position of the first sensor includes determining an actual position of the first sensor based on the first sensor data, comparing that actual position of the first sensor with the detected position of the first sensor to detect differences between the actual position and the detected position of the first sensor, and determining a difference amount based on the detected differences between the actual position and the detected position of the first sensor. For example, as illustrated in FIG. 4, the front of the device 110 is directed toward the eyepiece 316 of HMD 120. In particular, the display 410 of the device 110 is facing the eyepiece 316 of the HMD 120. The HMD 120 includes an IR LED 412 and IR LED 414 (e.g., as part of the IR ring), where each IR LED projects IR light waves through the eyepiece 316 towards the display 410 on the device 110. The display 410 reflects the IR light waves from IR LED 412 and IR LED 414 at reflective points 402 and 404, respectively. The IR camera 320 on the HMD 120 can detect the IR reflections from reflective points 402 and 404.

In some implementations, fiducial markers could be used for the reflective points 402 and 404. For example, as discussed herein, fiducial markers may be placed on a carrying case for the HMD 120, on the case or back cover of device 110 (e.g., on a case on the back of a mobile phone), or any rigid surface. The HMD 120 could then be localized based on the mechanical placement of the fiducial markers on whichever rigid surface they are placed, representing reflective points 402 and 404 in FIG. 4. Thus, the assessment device (e.g., device 110) may be a rigid object that allows for placement of fiducial markers at a particular location that can be used for localization and calibration. Additionally, or alternatively, fiducial markers could be presented on the display of a mobile device (e.g., device 110) as reflective points 402 and 404. For example, an image could be displayed on the display 410 of the device 110 that can be used for the calibration assessment with the HMD 120.

In some implementations, the device 110 can capture an image using a front facing camera on the device 110 to detect the LED rings on the HMD 120 to detect defects in the LED ring or eye tracking camera on the HMD 120. For example, the captured image of the LED rings on the HMD 120 by the camera of the device 110 can be used by the device to analyze and determine whether there are any defects in any of the LEDs of the LED ring. For example, the device can determine based on the captured image whether each LED is on, whether the actual position of each LED is aligned, or other possible defects, to detect calibration issues with the eye tracking components of the HMD 120 and/or to calibrate distortion effect of the eyepiece 316 of the HMD 120.

Figure 5:
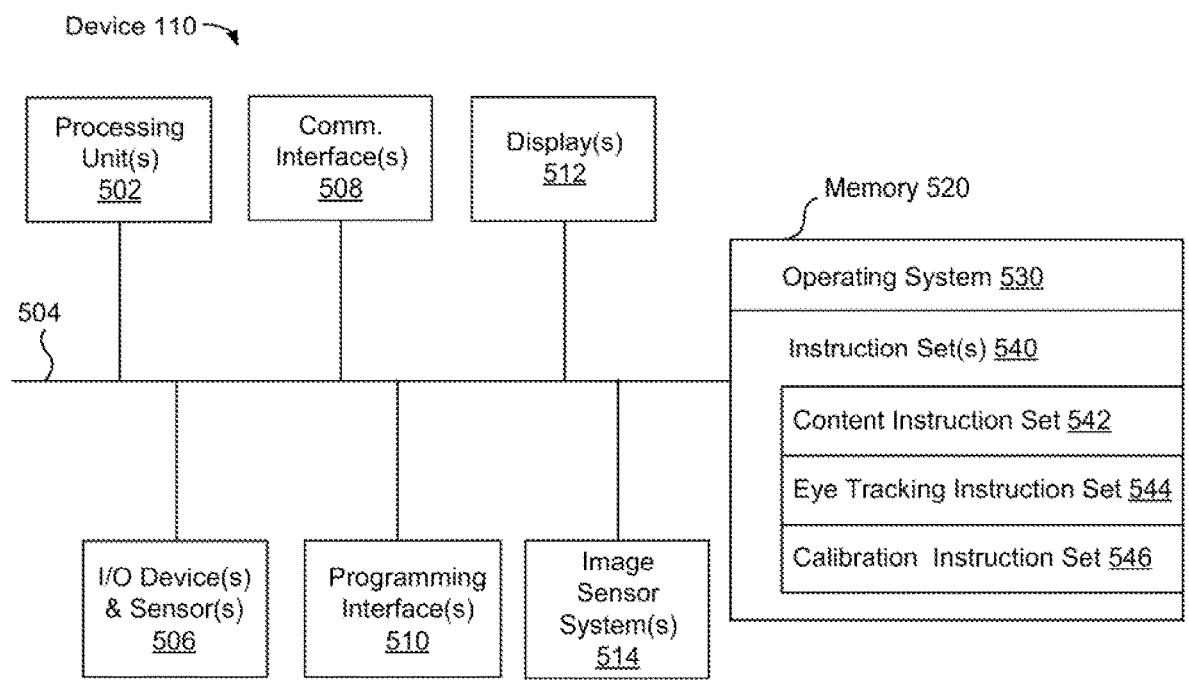
FIG. 5 illustrates an example device in accordance with some implementations.

FIG. 5 illustrates an example of the device 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 110 includes one or more processing units 202 (e.g., microprocessors, application-specific integrated-circuits (ASICs), field-programmable gate arrays (FPGAs), graphics processing units (CPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 520 includes high-speed random-access memory, such as DRAM, SRAM, DDR RAM, or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 includes a non-transitory computer readable storage medium.

In some implementations, the memory 520 or the non-transitory computer readable storage medium of the memory 520 stores an optional operating system 530 and one or more instruction set(s) 540. The operating system 530 includes procedures for handling various basic system services and for performing hardware dependent tasks. In some implementations, the instruction set(s) 540 include executable software defined by binary information stored in the form of electrical charge. In some implementations, the instruction set(s) 540 are software that is executable by the one or more processing units 502 to carry out one or more of the techniques described herein.

The instruction set(s) 540 include a content instruction set 542, an eye tracking instruction set 544, and a calibration instruction set 546. The instruction set(s) 540 may be embodied a single software executable or multiple software executables.

In some implementations, the content instruction set 542 is executable by the processing unit(s) 502 to provide and/or track content for display on a device. The content instruction set 542 may be configured to monitor and track the content overtime (e.g., during an experience) and/or to identify change events that occur within the content. In some implementations, the content instruction set 542 may be configured to inject change events into content using one or more of the techniques discussed herein or as otherwise may be appropriate. To these ends, in various implementations, the instruction includes instructions and/or logic therefor, and heuristics and metadata therefor.

In some implementations, the eye tracking (e.g., eye gaze characteristics) instruction set 544 is executable by the processing unit(s) 502 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

In some implementations, the calibration instruction set 546 is executable by the processing unit(s) 502 to assess the calibration of the HMD using another device (e.g., a mobile device such as device 110) as an input device (e.g., a controller) using one or more of the techniques discussed herein or as otherwise may be appropriate. To these ends, in various implementations, the instruction includes instructions and/or logic therefor, and heuristics and metadata therefor.

Although the instruction set(s) 540 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Moreover, FIG. 5 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 6:
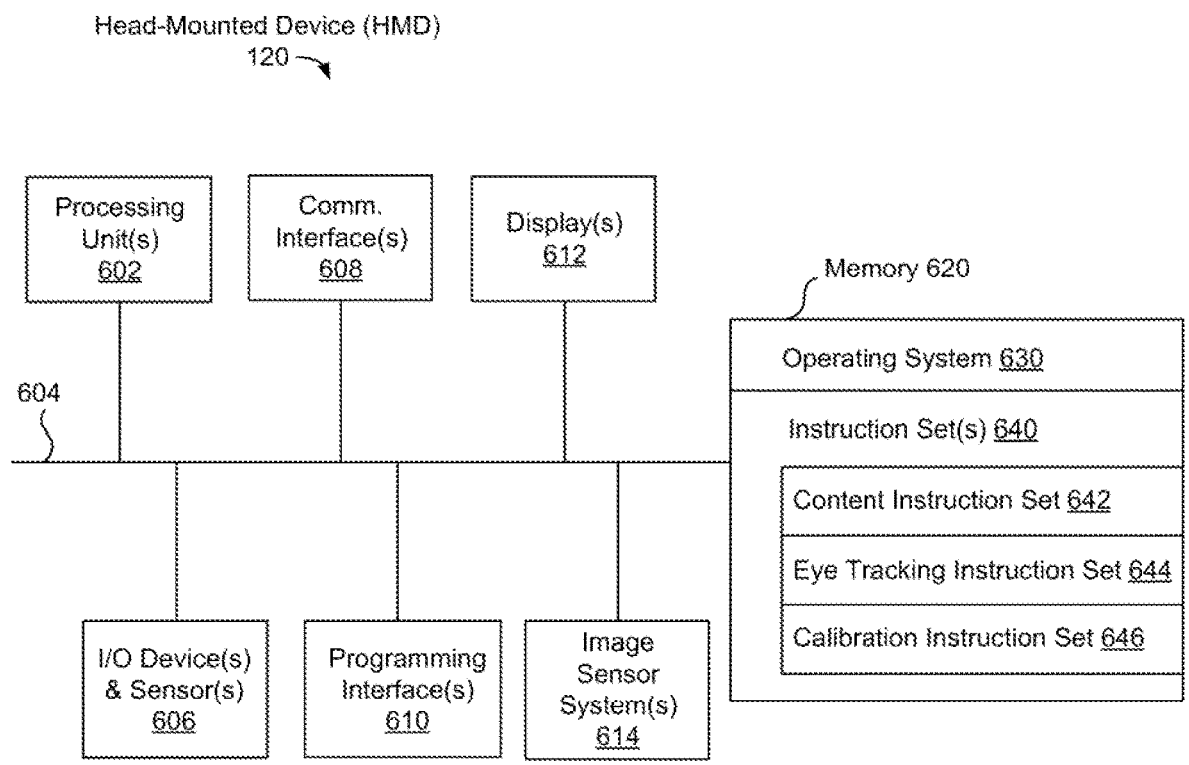
FIG. 6 illustrates an example HMD in accordance with some implementations.

FIG. 6 illustrates an example HMD (e.g., HMD 120 of FIG. 1) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 602 (e.g., microprocessors, ASICs, FPGAs, CPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like. In some implementations, one or more of these I/O devices and sensors 606, such as the IMU, is used to track movement of the gaze of the user's eyes.

In some implementations, the one or more displays 612 are configured to present a user experience to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), a retinal projection system, and/or the like display types. In some implementations, the one or more displays 612 correspond to diffractive, reflective, polarized, holographic, etc. waveguide displays. In one example, the HMD 120 includes a single display. In another example, the HMD 120 includes a display for each eye of the user.

In some implementations, the one or more image sensor systems 614 are configured to obtain image data that corresponds to at least a portion of the face of the user that includes the eyes of the user. For example, the one or more image sensor systems 614 include one or more RGB camera (e.g., with a complimentary metal-oxide-semiconductor (CMOS) image sensor or a charge-coupled device (CCD) image sensor), monochrome camera, IR camera, event-based camera, and/or the like. In various implementations, the one or more image sensor systems 614 further include illumination sources that emit light upon the portion of the face of the user, such as a flash or a glint source.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 include a content instruction set 642, an eye tracking instruction set 644, and a calibration instruction set 646. The instruction set(s) 640 may be embodied a single software executable or multiple software executables.

In some implementations, the content instruction set 642 is executable by the processing unit(s) 602 to provide and/or track content for display on a device. The content instruction set 642 may be configured to monitor and track the content overtime (e.g., during an experience) and/or to identify change events that occur within the content. In some implementations, the content instruction set 642 may be configured to inject change events into content using one or more of the techniques discussed herein or as otherwise may be appropriate. To these ends, in various implementations, the instruction includes instructions and/or logic therefor, and heuristics and metadata therefor.

In some implementations, the eye tracking (e.g., eye gaze characteristics) instruction set 644 is executable by the processing unit(s) 602 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

In some implementations, the calibration instruction set 646 is executable by the processing unit(s) 602 to assess the calibration of the HMD using another device (e.g., a mobile device such as device 110) as an input device (e.g., a controller) using one or more of the techniques discussed herein or as otherwise may be appropriate. To these ends, in various implementations, the instruction includes instructions and/or logic therefor, and heuristics and metadata therefor.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Moreover, FIG. 6 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 7:
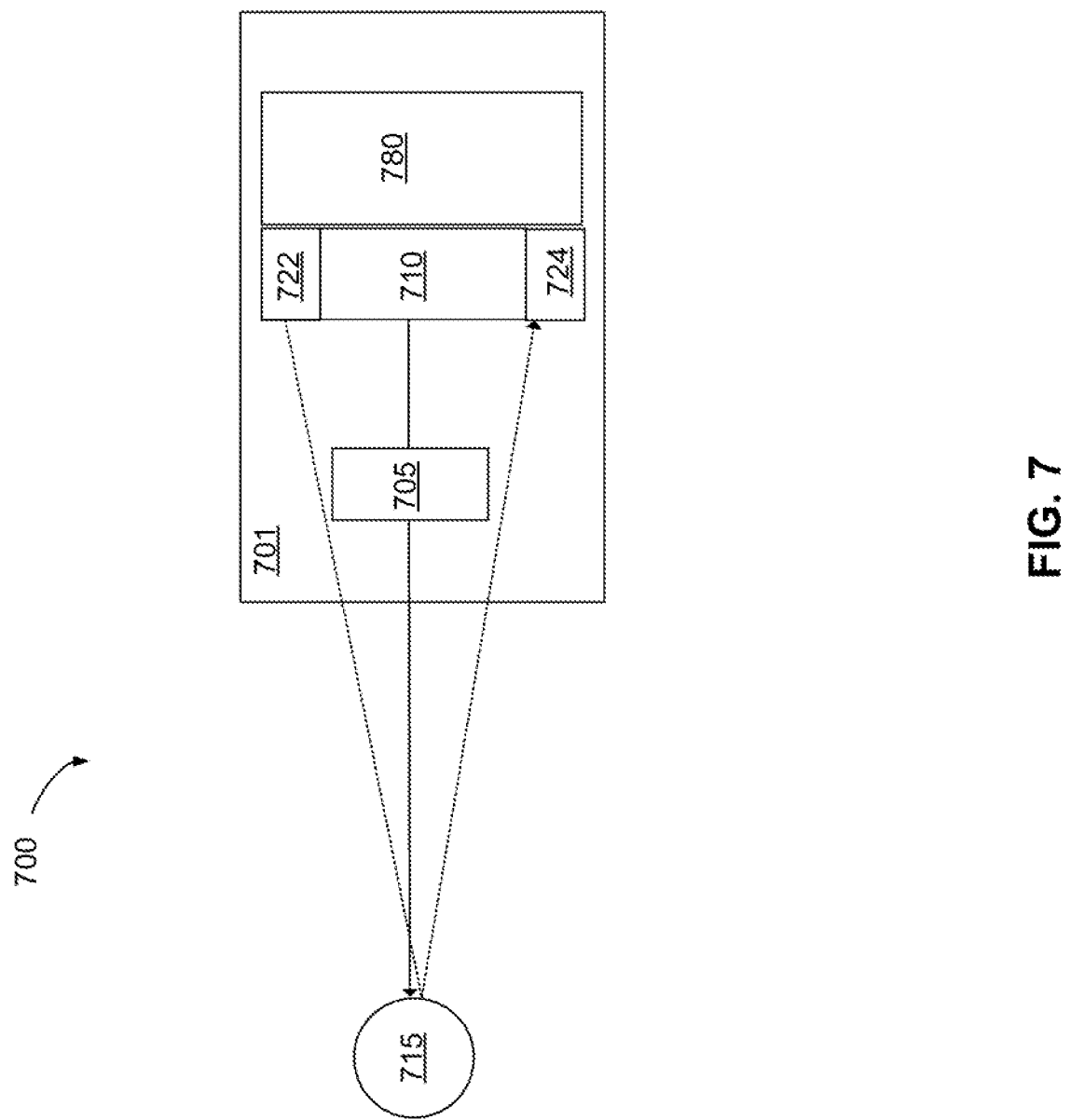
FIG. 7 illustrates an example HMD in accordance with some implementations.

FIG. 7 illustrates an exemplary head-mounted device 700 in accordance with some implementations. The head-mounted device 700 includes a housing 701 (or enclosure) that houses various components of the head-mounted device 700. The housing 701 includes (or is coupled to) an eye pad (not shown) disposed at a proximal (to the user 715) end of the housing 701. In various implementations, the eye pad is a plastic or rubber piece that comfortably and snugly keeps the head-mounted device 700 in the proper position on the face of the user 715 (e.g., surrounding the eye of the user 715).

The housing 701 houses a display 710 that displays an image, emitting light towards or onto the eye of a user 715. In various implementations, the display 710 emits the light through an eyepiece having one or more lenses 705 that refracts the light emitted by the display 710, making the display appear to the user 715 to be at a virtual distance farther than the actual distance from the eye to the display 710. For the user to be able to focus on the display 710, in various implementations, the virtual distance is at least greater than a minimum focal distance of the eye (e.g., 7 cm). Further, in order to provide a better user experience, in various implementations, the virtual distance is greater than 1 meter. In some implementation, the focal plane may additionally or alternatively vary according to where the user is gazing.

The housing 701 also houses a tracking system including one or more light sources 722, camera 724, and a controller 780. The one or more light sources 722 emit light onto the eye of the user 715 that reflects as a light pattern (e.g., a circle of glints) that can be detected by the camera 724. Based on the light pattern, the controller 780 can determine an eye tracking characteristic of the user 715. For example, the controller 780 can determine a gaze direction and/or a blinking state (eyes open or eyes closed) of the user 715. As another example, the controller 780 can determine a pupil center, a pupil size, or a point of regard. Thus, in various implementations, the light is emitted by the one or more light sources 722, reflects off the eye of the user 715, and is detected by the camera 724. In various implementations, the light from the eye of the user 715 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 715 selects an option on the display 710 by looking at it), provide foveated rendering (e.g., present a higher resolution in an area of the display 710 the user 715 is looking at and a lower resolution elsewhere on the display 710), or correct distortion (e.g., for images to be provided on the display 710).

In various implementations, the one or more light sources 722 emit light towards the eye of the user which reflects in the form of a plurality of glints.

In various implementations, the camera 724 is a frame/shutter-based camera that, at a particular point in time or multiple points in time at a frame rate, generates an image of the eye of the user 715. Each image includes a matrix of pixel values corresponding to pixels of the image which correspond to locations of a matrix of light sensors of the camera.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

In some implementations, the images displayed on the first device (e.g., a mobile device such as device 110 in FIG. 1) or on the device being calibrated (e.g., an HMD such as HMD 120 in FIG. 1) may include virtual content that is generated for an extended reality (XR) environment. In some implementations, the operating systems 530, 630 includes built in XR functionality, for example, including a XR environment application or viewer that is configured to be called from the one or more instruction sets 540, 640 to display a XR environment within a user interface. For example, the systems described herein may include a XR instruction set that is configured with instructions executable by a processor to provide a XR environment that includes depictions of a physical environment including real physical objects and virtual content. A XR instruction set can generate virtual depth data (e.g., depth images of virtual content) and virtual intensity data (e.g., light intensity images (e.g., RGB) of the virtual content). For example, one of the instruction sets 540 for the device 110 or instruction sets 640 for the HMD 120 could include a XR instruction set that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

A person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor:
   obtaining first sensor data captured by a first sensor of a first device, the first sensor comprising a camera and the first sensor data comprising a first image of a display of a second device;
   obtaining second sensor data captured by a second sensor of the second device;
   detecting a position of the first sensor of the first device based on the second sensor data;
   obtaining a second image that comprises an expected depiction of the display of the second device expected to be captured at the detected position of the camera of the first device; and
   assessing a calibration between the portion of the second device and the second sensor of the second device based on comparing the first image and the second image.

2. The method of claim 1, wherein
   comparing the first image and the second image comprises determining a difference amount based on detecting differences between the first image and the second image.

3. The method of claim 2, further comprising comparing the difference amount to a difference threshold to determine whether calibration is needed.

4. The method of claim 3, wherein in response to determining that calibration is needed, the method further comprises determining a type of calibration that is needed.

5. The method of claim 1, further comprising:
   adjusting calibration of the second device based on the assessed calibration of the second device.

6. The method of claim 5, wherein adjusting calibration of the second device comprises adjusting one or more components of the second device to compensate for differences between an actual position of the first sensor and the detected position of the first sensor so that the of the first sensor is adjusted to a calibrated state.

7. The method of claim 1, wherein the portion of the second device comprises a display of the second device.

8. The method of claim 1, wherein the portion of the second device comprises an infrared (IR) ring generated by the second device.

9. The method of claim 1, wherein obtaining second sensor data captured by the second sensor comprises tracking data obtained from eye-tracking components of the second device.

10. The method of claim 1, wherein obtaining second sensor data captured by the second sensor comprises tracking data obtained by producing infrared (IR) elements that are reflected off the first device to produce reflections that are captured by an IR sensor on the second device.

11. The method of claim 1, wherein detecting a position of the first sensor of the first device is further based on tracking sensor data obtained from an inertial measurement unit (IMU) on the first device.

12. The method of claim 1, wherein the first sensor further comprises at least one of:
   a light intensity camera;
   a depth camera.

13. The method of claim 1, wherein the first device is a mobile device.

14. The method of claim 1, wherein the second device is a head-mounted device (HMD).

15. A method, comprising:
    at a processor:
    obtaining first sensor data captured by a first sensor of a first device, the first sensor data comprising a first image of a display of a second device;
    obtaining second sensor data captured by a second sensor of the second device;
    detecting a position of the first sensor of the first device based on the second sensor data; and
    assessing a calibration between the portion of the second device and the sensor of the second device based on the first sensor data and the detected position of the first sensor, by:
    determining an actual position of the first sensor based on the first sensor data;
    comparing that actual position of the first sensor with the detected position of the first sensor to detect differences between the actual position and the detected position of the first sensor; and
    determining a difference amount based on the detected differences between the actual position and the detected position of the first sensor.

16. A device comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the one or more processors to perform operations comprising:
    obtaining first sensor data captured by a first sensor of a first device, the first sensors comprising a camera and the first sensor data comprising a first image of a display of a second device;
    obtaining second sensor data captured by a second sensor of the second device;
    detecting a position of the first sensor of the first device based on the second sensor data;
    obtaining a second image that comprises an expected depiction of the display of the second device expected to be captured at the detected position of the camera of the first device; and assessing a calibration between the portion of the second device and the second sensor of the second device based on comparing the first image and the second image.

17. The device of claim 16, wherein comparing the first image and the second image comprises determining a difference amount based on detecting differences between the first image and the second image.

18. The device of claim 16, wherein in response to determining that calibration is needed, the method further comprises determining a type of calibration that is needed.

19. A non-transitory computer-readable storage medium, storing program instructions executable on a computer to perform operations comprising:

obtaining first sensor data captured by a first sensor of a first device, the first sensors comprising a camera and the first sensor data comprising a first image of a display of a second device;

obtaining second sensor data captured by a second sensor of the second device;

detecting a position of the first sensor of the first device based on the second sensor data;

obtaining a second image that comprises an expected depiction of the display of the second device expected to be captured at the detected position of the camera of the first device; and assessing a calibration between the portion of the second device and the second sensor of the second device based on comparing the first image and the second image.

* * * * *